US008331777B2

(12) United States Patent
Goetzer

(10) Patent No.: US 8,331,777 B2
(45) Date of Patent: Dec. 11, 2012

(54) PASSIVE OPTICAL TEST TERMINATION

(75) Inventor: Martin Goetzer, Backnang (DE)

(73) Assignee: Ericsson AB, Stockholm (SE)

( * ) Notice: Subject to any disclaimer, the term of this patent is extended or adjusted under 35 U.S.C. 154(b) by 1241 days.

(21) Appl. No.: 11/913,570

(22) PCT Filed: Apr. 25, 2006

(86) PCT No.: PCT/EP2006/061802
§ 371 (c)(1), (2), (4) Date: Mar. 19, 2008

(87) PCT Pub. No.: WO2006/117311
PCT Pub. Date: Nov. 9, 2006

(65) Prior Publication Data

US 2008/0310837 A1 Dec. 18, 2008

(30) Foreign Application Priority Data

May 3, 2005 (GB) .................................. 0508825.7

(51) Int. Cl.
*H04B 10/08* (2006.01)
*H04B 17/00* (2006.01)

(52) U.S. Cl. ................ 398/13; 398/10; 398/16; 398/17; 398/20

(58) Field of Classification Search ................ 398/9–24, 398/33, 134, 167
See application file for complete search history.

(56) References Cited

U.S. PATENT DOCUMENTS 4,300,239 A 11/1981 Wakabayashi et al.
4,470,685 A 9/1984 Tsunekawa et al.
5,019,826 A * 5/1991 de La Chapelle et al. .... 342/202
5,510,925 A * 4/1996 Suzuki et al. .................. 398/18
6,414,768 B1 * 7/2002 Sakata et al. .................... 398/59
6,483,616 B1 11/2002 Maddocks
6,766,115 B1 * 7/2004 Sorin et al. .................... 398/161
6,947,668 B1 * 9/2005 Koeppen et al. ................ 398/16
7,343,094 B2 * 3/2008 Kawahata ....................... 398/16
7,359,635 B2 * 4/2008 Helbing et al. ................. 398/57
7,620,319 B2 * 11/2009 Krimmel ......................... 398/33
2002/0089713 A1 * 7/2002 Schwandner et al. ........ 359/110
2003/0011855 A1 1/2003 Fujiwara
2003/0198432 A1 * 10/2003 Rosen et al. .................... 385/27
2004/0208503 A1 * 10/2004 Shieh ............................. 398/13

FOREIGN PATENT DOCUMENTS

EP 0531047 A3 3/1993
EP 0784391 A3 11/2000
GB 2267792 A 12/1993
GB 2403087 A 12/2004
JP 55100759 A 7/1980
JP 58123246 7/1983
JP 60237736 11/1985
JP 9186651 7/1997
JP 2003309523 10/2003

* cited by examiner

*Primary Examiner* — Kenneth N Vanderpuye
*Assistant Examiner* — Abbas H Alagheband
(74) *Attorney, Agent, or Firm* — Coates & Bennett, P.L.L.C.

(57) ABSTRACT

An optical test termination device (100) for use in optical network comprising a passive optical element (102) and a first optical coupler (104) and a second optical coupler (106) for coupling the optical test termination device (100) to an optical fiber (108, 110, 202). The passive optical element (102) comprises an input for receiving a test signal from the network and an output for outputting a response signal towards the network, wherein in response to the test signal the passive optical element (102) is operable to output the response signal, wherein said response signal differs from said test signal.

14 Claims, 3 Drawing Sheets

PASSIVE OPTICAL TEST TERMINATION

FIELD OF THE INVENTION

The present invention relates to telecommunications networks, in general, and in particular to a passive test termination of an optical communication network.

BACKGROUND OF THE INVENTION

Fiber-to-the-Home (FTTH) or Fiber-to-the-Business (FTTB) are becoming more popular, as they can provide a lot more bandwidth over longer distances than copper lines can do. There is, however, no mechanism available, comparable to the one used for copper lines, to test the optical line. In solutions known in the art an Optical Network Termination (ONT) is used for testing the optical line. However the ONT devices require power to communicate with the network side. If the fiber is broken, no communication is possible any more. However, the absence of communication with the ONT does not necessarily mean that the fiber is broken: the ONT could be defect or power can be down.

Hence, an improved optical network test termination would be advantageous and in particular one that is independent of external power supply.

SUMMARY OF THE INVENTION

Accordingly, the invention seeks to preferably mitigate, alleviate or eliminate one or more of the disadvantages mentioned above singly or in any combination.

According to a first aspect of the present invention, there is provided an optical test termination device for use in an optical network comprising a passive optical element and a first optical coupler and a second optical coupler for coupling the optical test termination device to an optical fiber. The passive optical element comprises an input for receiving a test signal from the network and an output for outputting a response signal towards the network an optical delay line and an optically controlled optical switch, wherein in response to the test signal the passive optical element is operable to output the response signal, which length is changed comparing to a length of the test signal.

According to a second aspect of the present invention, there is provided a communications network, wherein at least portion of the network is based on transmission of optical signals over optical fibers. The network comprises an optical test termination device having a passive optical element and a first optical coupler and a second optical coupler for coupling the optical test termination device to an optical fiber. The passive optical element comprises an input for receiving a test signal from the network and an output for outputting a response signal towards the network, an optical delay line and an optically controlled optical switch, wherein in response to the test signal the passive optical element is operable to output the response signal, which length is changed comparing to a length of the test signal.

According to a third aspect of the present invention, there is provided a method of testing a termination of an optical network comprising: transmitting a test signal from the network towards said termination of said optical network, receiving said test signal by a passive optical element connected to said termination, and, in response to said reception of said test signal, transmitting by said passive optical element a response signal towards the network, wherein said passive optical element comprises an optical delay line and an optically controlled optical switch and length of said response signal is changed comparing to a length of said test signal.

Further features of the present invention are as claimed in the dependent claims.

The present invention beneficially allows for:

- measuring end-to-end availability of single or dual optical line from network side without special measurement receiver or transmitter on the network side;
- measuring without affecting normal operation;
- simplification of the termination equipment on the user side;
- application of the solution equally to single fiber mode and dual fiber mode networks.

BRIEF DESCRIPTION OF THE DRAWINGS

The present invention will be understood and appreciated more fully from the following detailed description taken in conjunction with the drawings in which.

DESCRIPTION OF AN EMBODIMENT OF THE INVENTION

The term “passive optical element” herein below refers to an optical element, which does not require power supply for operation.

The term “downstream” herein below refers to a stream of data in the direction from the network to the subscriber.

The term “upstream” herein below refers to a stream of data in the direction from the subscriber to the network.

Figure 1:
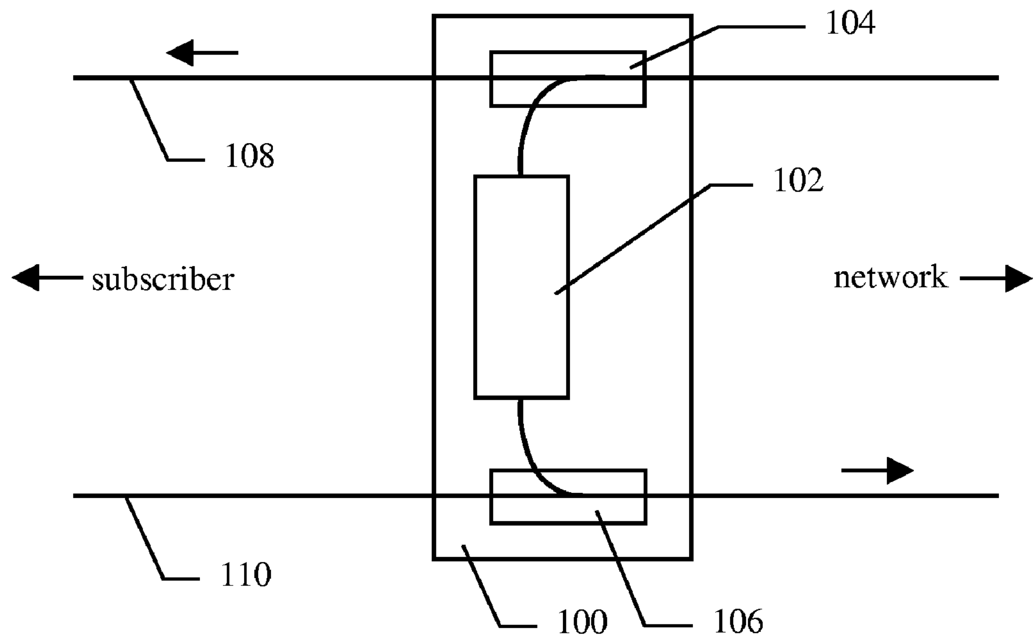
FIG. 1 is a diagram illustrating a communications network in one embodiment of the present invention.

Referring to FIG. 1 one embodiment of an optical test termination device 100 for use in optical network according to the present invention is illustrated.

In the embodiment of FIG. 1 the optical test termination device 100 comprises a passive optical element 102 and a first optical coupler 104 and a second optical coupler 106. The optical couplers 104, 106 allow for coupling the optical test termination device 100 to an optical fiber 108, 110 of the optical network. The passive optical element 102 comprises an input for receiving a test signal from the network and an output for outputting a response signal towards the network. To allow the network infrastructure assessing the state of the line, in response to the test signal, the passive optical element 102 is operable to output the response signal. To avoid situation in which the network infrastructure makes false assessment the response signal differs from said test signal. The issue of false assessments is a result of the fact that a broken fiber works like a mirror, and the test signal simply comes back the same way it has been sent, just attenuated. Even in dual fiber mode (i.e. when two separate fibers are used to connect the subscriber’s equipment and the network) it may happen that by accident the up- and downstream fibers are cut in a way that light from the downstream gets fed into the upstream and finally is received back by the network infrastructure. This situation may happen for example in a fire where the fibers melt somehow. So to avoid such misinterpretation the optical test termination device in accordance with the present invention creates a very different response signal compared to test signal (i.e. also different compared to signal reflected by a broken fibre).

In one embodiment at least one parameter of the response signal is in a non-linear relation to a corresponding parameter of the test signal. There are number of possible implementations of the non-linear relation. In one implementation the passive optical element 102 outputs a response signal which length is changed comparing to a length of the test signal.

Figure 3:
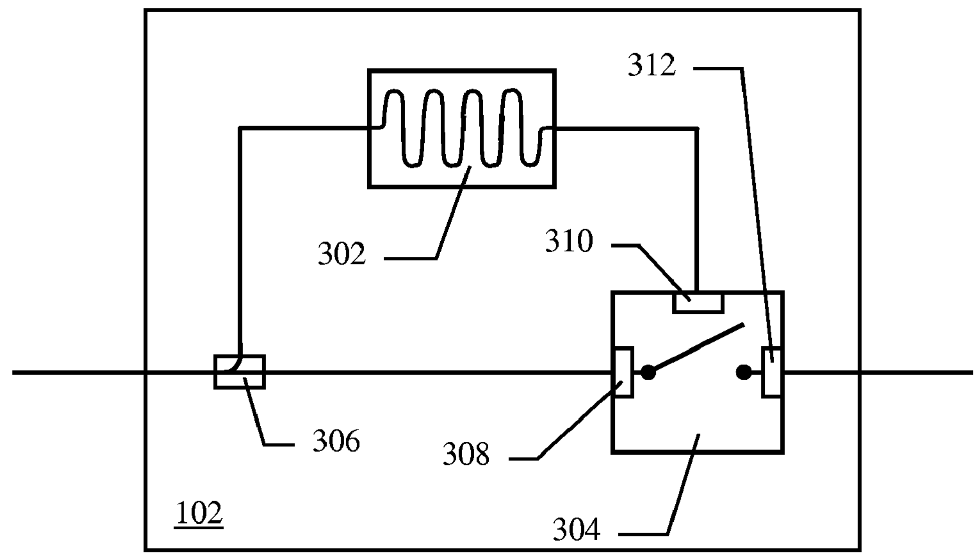
FIG. 3 is a diagram illustrating a passive optical element for use in an optical test termination device in one embodiment of the present invention.
Figure 4:
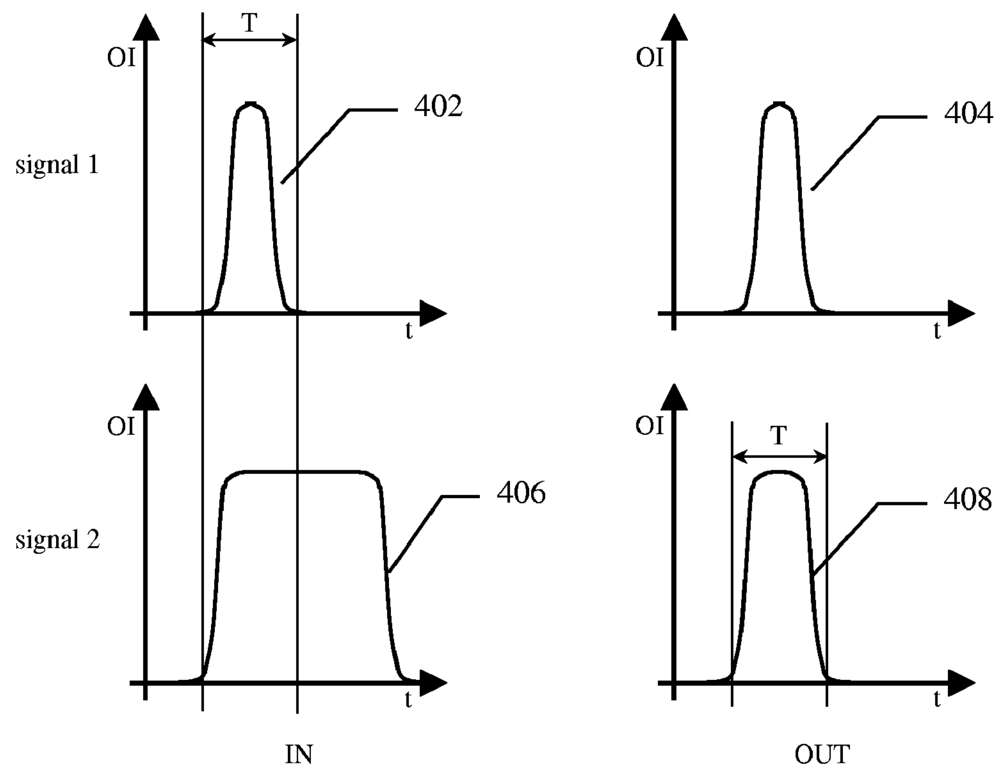
FIG. 4 illustrates how a passive optical element responds to different input signals in one embodiment of the present invention.

With reference to FIG. 3 and FIG. 4 one possible implementation of the passive optical element 102 and the way it operates are depicted. The passive optical element 102 comprises an optical delay line 302 and an optically controlled optical switch 304.

In operation, when an optical signal is split at point 306 part of the signal goes directly to an input port 308 of the optically controlled optical switch 304 and the other part goes to the control port 310 of the optically controlled optical switch 304 via the delay line 302. The optically controlled optical switch 304 works in a way that it breaks the line between its input 308 and output 312 ports if a control signal is received at the control port 310. If the delay line 302 has a delay parameter T the optical signal transmitted via the delay line 302 will trigger the optically controlled optical switch 304 T time after receiving the signal transmitted directly from split point 306 to the switch 304. In consequence, signals 402 with length shorter and equal than the delay parameter T will be transmitted via the switch 304 unaffected 404 and signals 406 with length longer than the delay parameter T will be trimmed to the length T 408. The parameters on the axes of FIG. 4 are optical intensity (OI) and time (t).

In an embodiment of the present invention the test signal transmitted by the network infrastructure is significantly longer than the delay parameter T and the response signal transmitted by the optical test termination device 100 comprising the passive optical element 102 will be characterized by its length equal T. If the network infrastructure receives in reply to the test signal a response signal that has time parameter T it indicates that the line to the subscriber functions properly. In turn, if the response signal is not received by the network infrastructure it indicates a fault on the line (the line is broken or bent).

In alternative embodiments the passive optical element 102 is adapted to change other parameters of the test signal.

In one embodiment the passive optical element 102 of the optical test termination device 100 outputs the response signal with light intensity which is in non-linear relation to light intensity of the test signal. In this embodiment the response signal is attenuated by a predefined percentage and if such attenuated response signal is received by the network infrastructure it indicates that the optical line to the subscriber operates properly.

In another embodiment the passive optical element 102 of the optical test termination device 100 outputs the response signal having a wavelength different from a wavelength of the test signal. In this embodiment the test signal is characterized by a certain wavelength and the passive optical element 102 shifts this certain wavelength by a predefined value. In consequence, if the network infrastructure receives a response signal that differs from the test signal only in the predefined wavelength shift it indicates that the optical line to the subscriber operates properly.

In yet another embodiment the passive optical element 102 of the optical test termination device 100 outputs the response signal, wherein a message carried by the response signal is different from a message carried by the test signal.

According to a second aspect of the present invention a communications network is defined. In one embodiment at least portion of the network is based on transmission of optical signals over optical fibers 108, 110, 202. It is clear for those specialized in the art that today's communications networks are not based on only one physical medium. On the contrary, the communications networks are combinations of physical links based on fiber optics, copper cables and/or radio links. The selection of the physical medium is based on bandwidth, quality and technical requirements (e.g. radio links are deployed is situations when it is not possible or not economically feasible to build cable or fiber optics infrastructure). The communications network in the present embodiment comprises an optical test termination device 100 having a passive optical element 102 and a first optical coupler 104 and a second optical coupler 106 for coupling the optical test termination device 100 to an optical fiber 108, 110. Said passive optical element 102 comprises an input for receiving a test signal from the network and an output for outputting a response signal towards the network. To avoid situation in which the network infrastructure makes false assessment the response signal differs from said test signal.

With reference to FIG. 1 one embodiment of the termination of the communications network is presented. For clarity only the termination part of the network is shown. In this embodiment the subscriber line consists of two fibers (i.e. dual fiber mode). The first optical coupler 104, which is connected to the input of the passive optical element 102, is coupled to a downstream fiber 108 whereas the second optical coupler 106, which is connected to the output of the passive optical element 102, is coupled to an upstream fiber 110.

Figure 2:
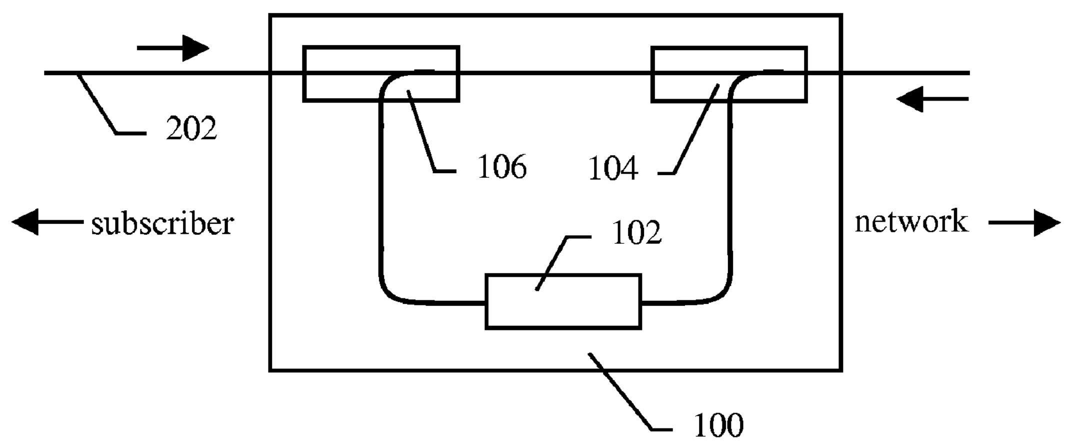
FIG. 2 is a diagram illustrating a communications network in one embodiment of the present invention.

With reference to FIG. 2 an alternative embodiment of the communication network in accordance with the present invention is shown. Again, for clarity only the termination part of the network is illustrated. In this embodiment the optical part of the communications network operates in a single fiber mode (i.e. only one fiber 202 goes to the subscriber's home or office). In such configuration the first optical coupler 104, which is connected to the input of the passive optical element 102, is coupled to the fiber 202 on the network side and the second optical coupler 106, which is connected to the output of the passive optical element 102, is coupled to the fiber 202 on the subscriber side.

In one embodiment, when the communications network operates in a single fiber mode and the single fiber operation is based on wavelength separation of up- and downstreams, the communications network comprises on the network side a receiver adapted to receive response signals and normal operation signals. Alternatively the communications network comprises on the network side a splitter for separation of the response signals from the normal operation signals and a first receiver for receiving said response signals and a second receiver for receiving said normal operation signals. Only in a single fiber mode there could be necessary to have two receivers for the two wavelengths. In dual fiber mode, there is usually only one wavelength, the same for upstream and downstream. Therefore there is no chance to separate test and normal signal on the receiver of the network end, as both are the same wavelength. It is, however, not necessary, because the test would have to be carried out during non-operation time (during operation, when everything operates properly, there is no real need to have a detection mechanism that says the line is still there).

Figure 5:
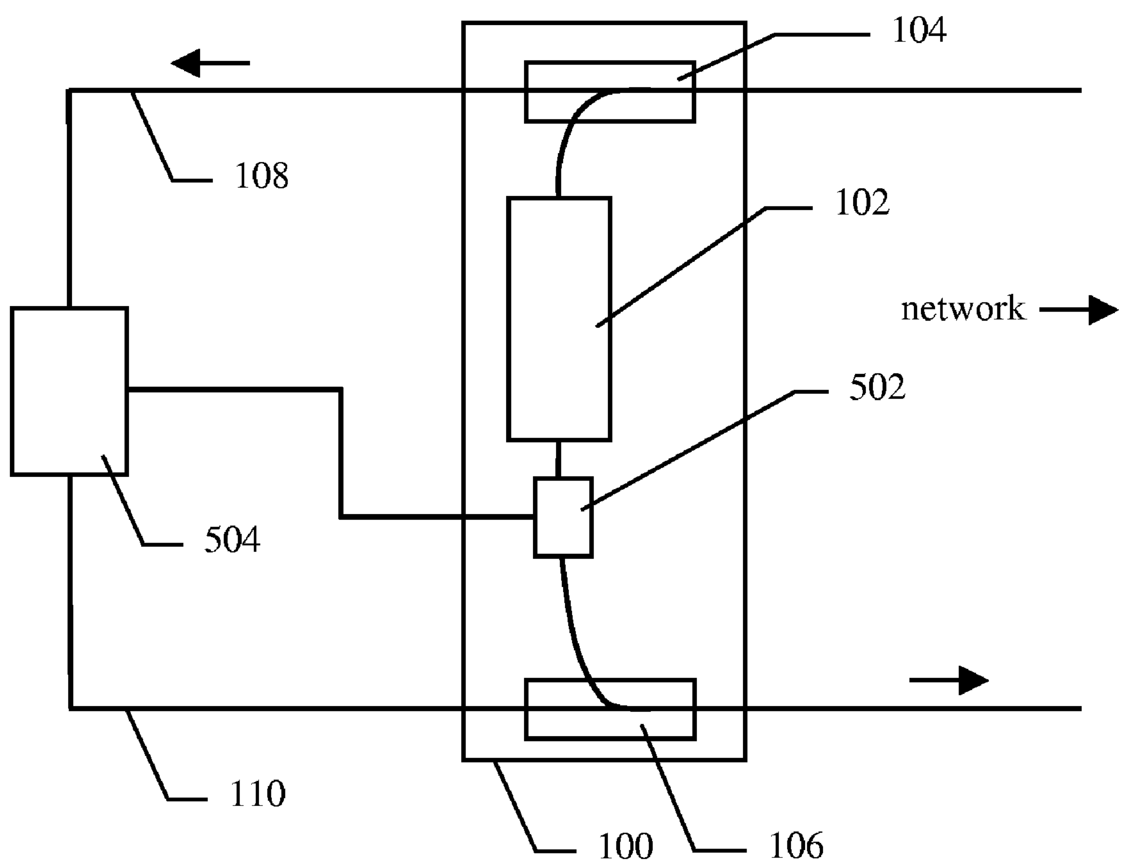
FIG. 5 is a diagram illustrating a communications network in one embodiment of the present invention.

With reference to FIG. 5 another embodiment the communications network is shown (only the terminal part of the network is depicted). The communications network further comprises an electrically controlled optical switch 502 operable to switch off the response signal during normal operation. The subscriber's device 504 switches off the passive return path by controlling operation of the electrically controlled optical switch 502 as soon as the subscriber's device 504 detects an incoming signal and sends something back towards the network. It means that as long as the subscriber's device 504 receives and transmits signals to the network the operation of the optical test termination device 100 is disabled. Reception and transmission in response to the reception is enough evidence that the line is working properly. In turn, if the subscriber's device 504 stops receiving and transmitting in response to the received signals the electrically controlled optical switch 502 switches on the passive return path and the optical test termination device 100 is enabled.

In yet another embodiment if the passive optical element 102 has a short time to switch the optical path off, but a relatively long time to switch it on again, no light will come out of the element during normal operation because light enters the element frequently enough to keep the optically controlled optical switch 304 in an "off position". As an example a dual fiber operation will be considered. In a dual fiber mode operation both the normal operation signal and the response signal from the optical test termination device 100 add up to sort of disturbed signal transmitted towards the network side. Therefore to avoid interference between the normal operation signal and the response signal causing deterioration of the signal transmitted towards the network the return path of the optical test termination device 100 should be switched off during normal operation. As outlined above the return path is not necessary during normal operation. This can be done using an electrical switch as explained in the previous embodiment, or in a passive way. In description of this embodiment it is explained how the optically controlled optical switch 304 may carry out this by itself without an additional electrically switched optical switch if it takes a short time to switch the optically controlled optical switch 304 off, and a longer time to switch it on again. During normal operation, the downstream will be modulated, i.e. light switched on and off at a high frequency. If the time it takes to switch this optical switch on again is relatively long compared to the modulation period, the switch would be switched off at the first signal, try to switch itself on again, but during that time the optically controlled optical switch 304 will be hit by the next signal and forced off again. This leads to a switch that is switched off all the time during normal operation. If a test of the line is required only the test signal is transmitted through the line. The test signal must be modulated in a way that that the optically controlled optical switch 304 is able to switch on and off in response to the test signals.

The invention claimed is:

1. An optical test termination device for use in an optical network, comprising:

- a first optical coupler and a second optical coupler configured to couple the optical test termination device to an optical fiber;
- a passive optical element comprising
  - an input configured to receive a test signal from the network;
  - an output configured to output a response signal towards the network;
  - an optical delay line; and
  - an optically controlled optical switch;
- wherein the passive optical element is configured to output the response signal responsive to receiving the test signal, the response signal having a length that is different than a length of the test signal.

2. The device of claim 1 wherein the passive optical element is configured to output the response signal to carry a message that is different from a message carried by the test signal.

3. The device of claim 1 wherein a switch-off time of the optically controlled optical switch is less than a switch-on time of the optically controlled optical switch.

4. The device of claim 1 further comprising an electrically controlled optical switch configured to switch off the response signal during normal operation.

5. A communications network in which at least a part of the network is an optical network configured to carry optical signals over optical fibers, the network comprising:

- at least one optical fiber to communicate optical signals; and
- an optical test termination device comprising:
  - a first optical coupler and a second optical coupler configured to couple the optical test termination device to one or more optical fibers;
  - a passive optical element comprising
    - an input configured to receive a test signal from the network;
    - an output configured to output a response signal towards the network;
    - an optical delay line; and
    - an optically controlled optical switch;
  - wherein the passive optical element is configured to output the response signal responsive to receiving the test signal, the response signal having a length different than a length of the test signal.

6. The network of claim 5 wherein the first optical coupler is configured to connect the input of the passive optical element to a downstream optical fiber, and wherein the second optical coupler is configured to connect the output of the passive optical element to an upstream optical fiber.

7. The network of claim 5 wherein the first optical coupler is configured to connect the input of the passive optical element to an optical fiber on a network side, and wherein the second optical coupler is configured to connect the output of the passive optical element to the same optical fiber on a subscriber side.

8. The network of claim 7 further comprising a receiver disposed on the network side of the optical fiber from the optical test termination device, the receiver configured to receive response signals and normal operation signals.

9. The network of claim 8 further comprising a separator disposed on the network side of the optical fiber from the optical test termination device, the separator configured to separate the response signals from the normal operation signals.

10. The network of claim 9 further comprising:

- a first receiver configured to receive the response signals; and
- a second receiver configured to receive the normal operation signals.

11. The network of claim 5 wherein a switch-off time of the optically controlled optical switch is less than a switch-on time of the optically controlled optical switch.

12. The network of claim 5 further comprising an electrically controlled optical switch configured to switch off the response signal during normal operation.

13. The network of claim 5 wherein the passive optical element is configured to output the response signal to carry a message that is different from a message carried by the test signal.

14. A method of testing a termination of an optical network, the method comprising:

transmitting a test signal towards a termination of an optical network;

receiving the test signal at a passive optical element connected to the termination of the optical network, the passive optical element comprising an optical delay line and an optically controlled optical switch; and transmitting a response signal from the passive optical element towards the optical network responsive to receiving the test signal, a length of a response signal being different than a length of the received test signal.

* * * * *

UNITED STATES PATENT AND TRADEMARK OFFICE

CERTIFICATE OF CORRECTION

PATENT NO. : 8,331,777 B2
APPLICATION NO. : 11/913570
DATED : December 11, 2012
INVENTOR(S) : Goetzer It is certified that error appears in the above-identified patent and that said Letters Patent is hereby corrected as shown below:

On the Title Page, in Item [74], under “Attorney, Agent, or Firm”, in Column 2, Line 1, delete “Coates” and insert -- Coats --, therefor.

In the Specification

Column 2, Line 33, delete “DESCRIPTION” and insert -- DETAILED DESCRIPTION --, therefor.

In the Claims

Column 5, Line 58, Claim 1, delete “comprising” and insert -- comprising: --, therefor.

Column 6, Line 20, Claim 5, delete “comprising” and insert -- comprising: --, therefor.

Signed and Sealed this
Thirteenth Day of May, 2014

Michelle K. Lee

Michelle K. Lee
*Deputy Director of the United States Patent and Trademark Office*